United States Patent [19]

Craig

[11] Patent Number: 5,570,858
[45] Date of Patent: Nov. 5, 1996

[54] AIRCRAFT RESTRAINING SYSTEM

[75] Inventor: Thomas M. Craig, Loanhead, Scotland

[73] Assignee: MacTaggart Scott (Holdings) Limited, Midlothian, United Kingdom

[21] Appl. No.: 376,594

[22] Filed: Jan. 20, 1995

[30] Foreign Application Priority Data

Jan. 21, 1994 [GB] United Kingdom ............... 9401151

[51] Int. Cl.$^6$ ..................................................... B64F 1/12
[52] U.S. Cl. .......................... 244/115; 244/116; 114/261
[58] Field of Search ...................... 244/115, 116, 244/50, 17.17, 137.1; 114/261, 262; 414/729

[56] References Cited

U.S. PATENT DOCUMENTS

| | | | |
|---|---|---|---|
| 3,291,422 | 12/1966 | Van Valkenburg | 244/114 |
| 3,640,490 | 2/1972 | Baekken | 244/116 |
| 3,830,452 | 8/1974 | Seay | 244/116 |
| 4,123,020 | 10/1978 | Korsak | 244/116 |
| 4,319,722 | 3/1982 | Pesando | 244/116 |
| 4,420,132 | 12/1983 | Martin | 244/115 |
| 4,529,152 | 7/1985 | Bernard | 244/116 |
| 4,558,790 | 12/1985 | Bruce-Walker | 244/115 |
| 4,786,014 | 11/1988 | Pesando et al. | 244/115 |
| 5,102,091 | 4/1992 | Craig | 244/116 |
| 5,248,115 | 9/1993 | Aurelio | 244/115 |
| 5,347,947 | 9/1994 | Craig | 114/261 |

FOREIGN PATENT DOCUMENTS

| | | |
|---|---|---|
| 0 208 439 | 1/1987 | European Pat. Off. . |
| 0 449 702 A1 | 10/1991 | European Pat. Off. . |
| 0 518 405 A1 | 12/1992 | European Pat. Off. . |
| 598.590 | 6/1925 | France . |
| 28 02 231 | 1/1978 | Germany . |
| 1 556 892 | 1/1977 | United Kingdom . |
| 2 075 931 | 11/1981 | United Kingdom . |
| WO93/17910 | 8/1993 | WIPO . |

*Primary Examiner*—Andres Kashnikow
*Assistant Examiner*—Tien Dinh
*Attorney, Agent, or Firm*—Pennie & Edmonds

[57] ABSTRACT

An aircraft restraining system is utilised for securing and handling an aircraft on the deck of a ship. The system includes two elongate restraining beams which ere transversely movable from respective storage positions for engaging at least two spaced portions of an aircraft, such as wheel spurs. Each restraining beam includes a restraining member, such as a latch arrangement, for engaging the wheel spurs and restricting longitudinal movement of the spurs, and thus of the aircraft. At least one of the latches is movable along the respective beam to permit a secured aircraft to be rotated on the deck.

18 Claims, 8 Drawing Sheets

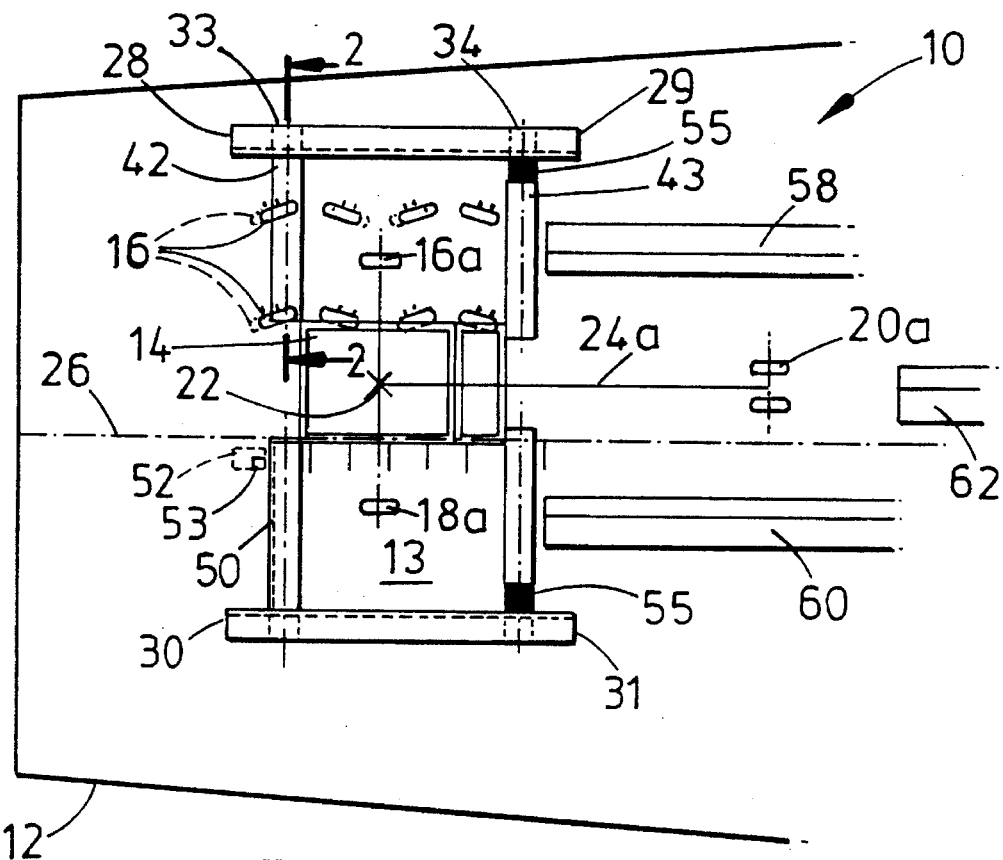
FIG.1
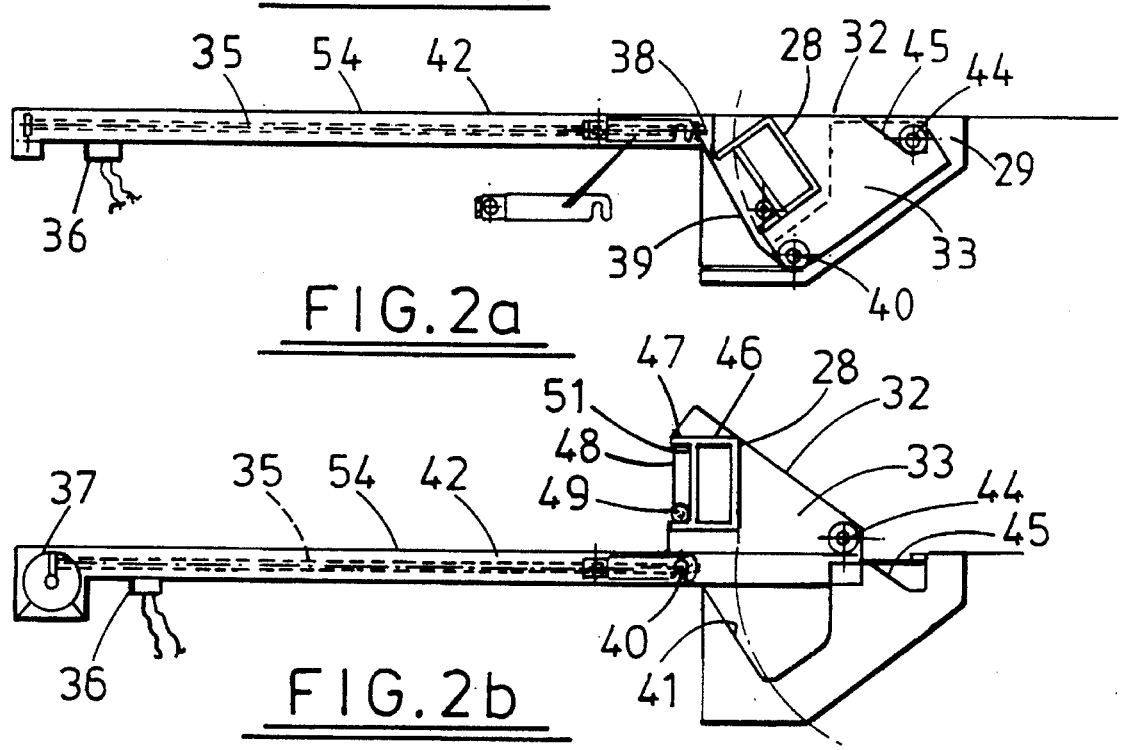
FIG.2a
FIG.2b

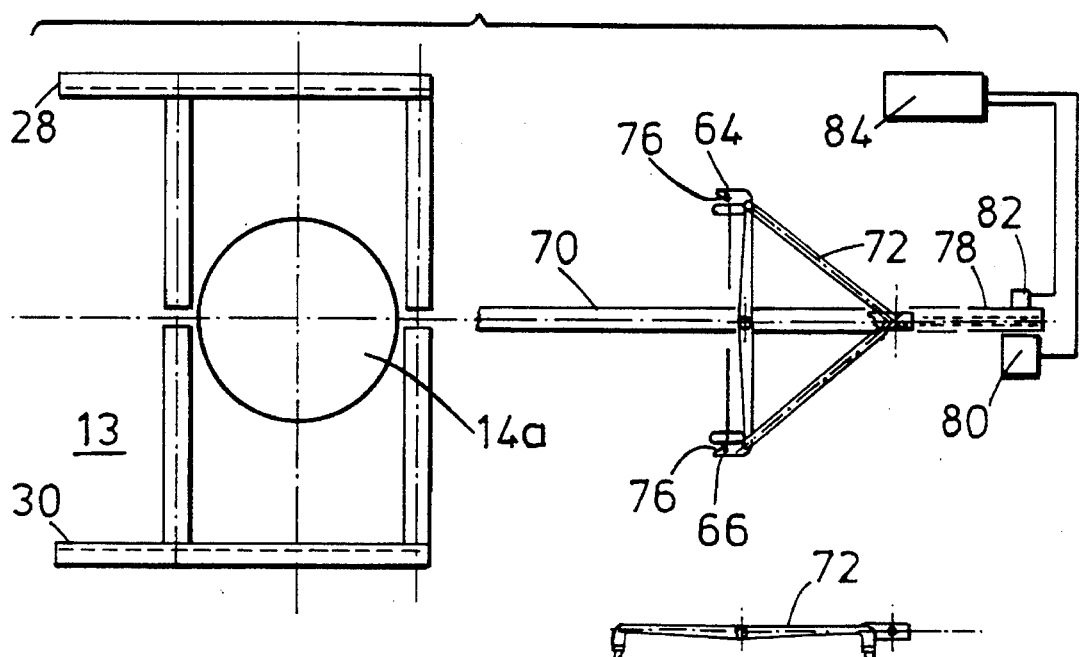
FIG.10
FIG.10a
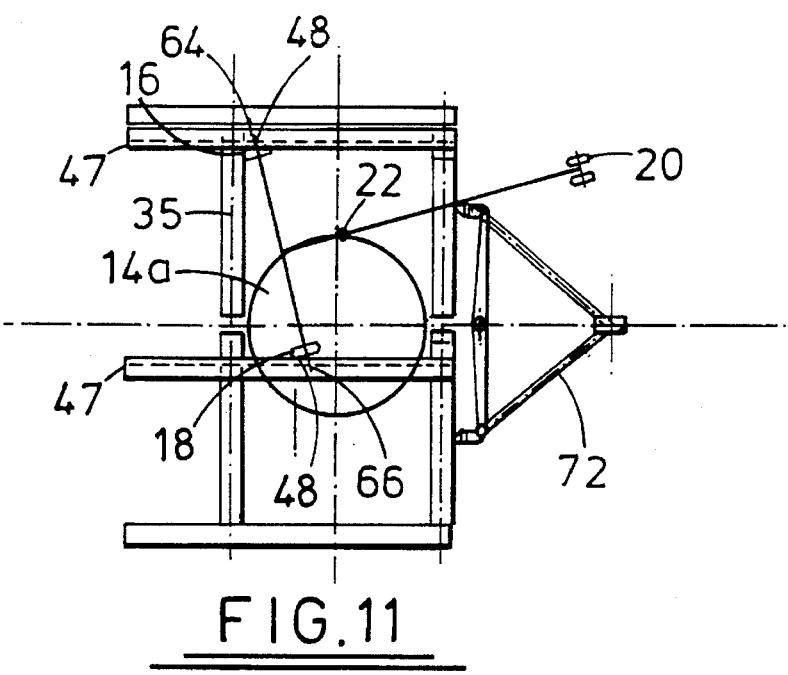
FIG.11

AIRCRAFT RESTRAINING SYSTEM

The present invention relates to an aircraft restraining system for securing an aircraft on the deck of a ship.

BACKGROUND OF THE INVENTION

On a helicopter landing on the deck of a ship in rough sea conditions it is necessary to secure the aircraft immediately on landing, to prevent the aircraft from sliding or toppling, which may otherwise result in damage or even loss of the aircraft. Typically, the aircraft will then be transferred from the landing area to a storage hangar.

Many aircraft required to land on ships are provided with decklocks, in the form of probes usually on the rotor axis, which may be extended on the helicopter landing on the deck of a ship to engage with a landing grid. The decklock operates in a harpoon-like manner and once engaged with the grid pulls the aircraft into firm engagement with deck. The aircraft may then be engaged by a shuttle provided on a transfer rail to allow the aircraft to be transferred from the landing deck to a storage hangar. Examples of this form of system are described in U.S. Pat. Nos. 4,319,722 and 4,786,014 to Pesando and Pesando et al, respectively, and European Patent Application No. 0,208,439 in the name of MacTaggatt Scott (Holdings) Ltd. Other systems, in which a decklock or similar attachment is engaged directly by the shuttle of a transfer system, without engaging a landing grid, are disclosed in U.S. Pat. Nos. 4,123,020, 5,347,947, 4,420, 132 to Korsak, Martin and Craig, respectively. While such systems may provide adequate security for an aircraft in most sea conditions, in very rough conditions the decklock may not be capable of restraining the aircraft.

Other systems nave been proposed in which further attachment methods are provided in addition to or as an alternative to the decklock, including U.S. Pat. Nos. 3,830, 452 and 4,529,152 to Seay and Bernard, respectively, and International Patent Application Publication No. WO93/17910 to MacTaggatt Scott (Holdings) Limited. However, such further attachments are provided at or adjacent to the longitudinal axis of the aircraft and thus may not be sufficient to prevent toppling of the aircraft in the roughest sea conditions. Also, the disclosed systems require the presence of operators on deck to secure the attachments, or manoeuvring of the aircraft while only engaged with the deck via the decklock.

There have been a number of proposals for systems in which the main wheels of the aircraft are secured to a shuttle assembly on a transfer rail, including U.S. Pat. Nos. 5,102, 091 to Craig, UK Patent Application GB 2075931 to Daf Indal Limited and European Patent Application 0449702 to Aerospatial Societa National Industrials. However, as with the arrangements described above, the transfer rails tends to Be located at or adjacent the longitudinal axis of the aircraft and are thus not best suited to prevent toppling of the aircraft. Further, such systems typically require the presence of an operator to secure the main wheels to the shuttles: in the roughest sea states there are no operators on deck.

French Patent No. 598,590, dating from 1925, discloses an arrangement for securing airships in which a pair of laterally spaced hooks, mounted on the upper ends of pistons, are provided for engaging eyelets provided on extendable arms on the airship. The arms are movable inwardly such that the eyelets may be engaged with the hooks to maintain the airship level, and when the airship is to take off the pistons may be extended before the arms themselves are extended to release the eyelets from the hooks. It is considered that such a system would be unsuitable for use on ships for securing aircraft, due to the accurate relative location of the aircraft and the hooks that would be required, and also the similarly accurately timed actuation of the arms by the aircrew when the necessary relative location was achieved.

U.S. Pat. No. 5,248,115 to Aurelio discloses devices for gripping and handling helicopters on ships' decks including a pair of beams initially set parallel to the longitudinal axis of the ship and mounted on a pair or transverse rails. The beams are moved inwardly to engage the skids or wheels of the helicopter, the beams being pivoted to lie parallel to the longitudinal axis of the helicopter. The beams then lift the helicopter from the deck before rotating and moving the helicopter transversely to a position in which the helicopter may be engaged by a trolley mounted on a longitudinally mounted rail.

SUMMARY OF THE INVENTION

According to the present invention there is provided an aircraft restraining system adapted for securing an aircraft on the deck of a ship, the system comprising two elongate restraining beams transversely movable from respective storage positions and adapted for engaging at least two spaced portions of an aircraft, each restraining beam including a restraining member adapted for engaging the respective portions of the aircraft and restricting longitudinal movement thereof, at least one of the members being actuable for movement along the respective beam, following engagement with the aircraft, to rotate the aircraft.

In use, the system is used to secure an aircraft immediately it lands on the deck, and without requiring the presence of operators on the deck. Typically, the system will be utilised to secure helicopters landing on the decks of ships and will engage the spurs which extend laterally from the main wheels thereof, such that the aircraft fuselage will not move on the elasticity of its tires under ship motion. Also, the system will likely be used in conjunction with an aircraft decklock and the restraining beams will be actuated immediately the decklock is engaged in the landing grid provided on the deck.

Preferably, in the storage position, the restraining beams lie flush with or below the deck, and thus do not present an inconvenient and potentially hazardous projection from the deck surface when not in use.

Preferably also, the restraining beams are movable from the aircraft engaging position while adapted to remain engaged with the aircraft. Thus, the aircraft may remain secured on the deck as it is, for example, moved to a location for engagement with an aircraft transfer shuttle.

Preferably also, each restraining member is in the form of a latch. Each latch may be movable from a latch storage position along a respective beam to engage with the aircraft. Most preferably, both latches may be driven such that the aircraft may be rotated to a limited degree by relative movement of the latches along the respective beams, and thus said parts of the aircraft along the beams, accompanied by appropriate transverse movement of at least one of the beams. When operated in conjunction with a decklock, the aircraft may be rotated about the engaged decklock. Also, if the aircraft is provided with transversely extending portions, such as main wheel spurs, rotation of the aircraft to an orientation parallel with the landing area will optimise the length of the portions engaged with the restraining beams.

Preferably also, the system further includes means for transferring the aircraft from the landing area and the restraining beams are movable to bring the portions of the aircraft to engage with the transfer means. Conveniently, the transfer means includes respective shuttles adapted for engaging said portions of the aircraft. Preferably, said shuttles are also arranged to secure the aircraft against toppling and are movable along respective transversely spaced tracks. Alternatively, the transfer means may include a traversing frame movable along a single track.

Preferably also, the system includes transversely movable supports adapted for the main wheels of the aircraft to permit transverse movement of the secured aircraft, for alignment with the aircraft transfer means.

BRIEF DESCRIPTION OF THE DRAWINGS

This and other aspects of the present invention will now been described, by way of example, with reference to the accompanying drawings, in which:

FIG. 1 is a somewhat schematic plan view of an aircraft restraining system in accordance with a first embodiment of the present invention;

FIGS. 2a, and 2b correspond to sectional views on lines 2—2 of FIG. 1, shown somewhat enlarged and illustrating movement of a restraining beam between storage and in use positions;

FIG. 10 is a somewhat schematic plan view of an aircraft restraining system in accordance with a second embodiment of the present invention; and FIGS. 11 to 15 are plan views of the system of FIG. 10 illustrating an exemplary aircraft landing and handling operation.

DETAILED DESCRIPTION OF THE DRAWINGS

Figure 3:
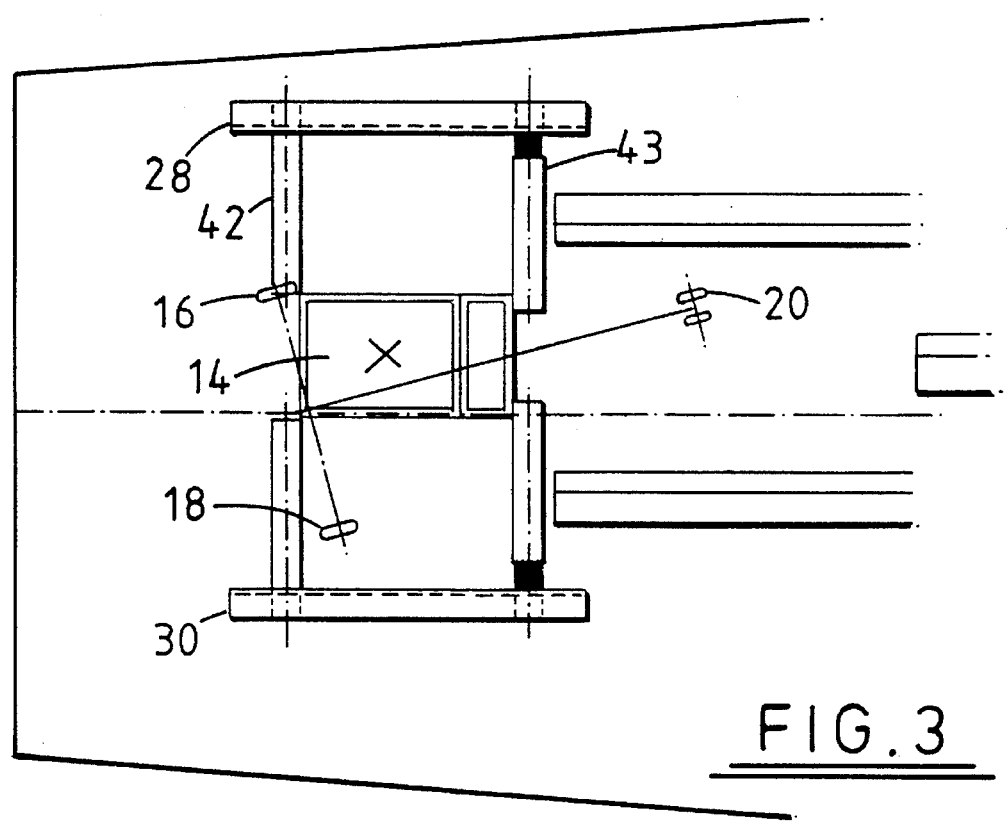
FIG. 3 is a somewhat schematic plan view of the system of FIG. 1 illustrating an exemplary aircraft landing, the system being illustrated prior to actuation.

Reference is first made to FIG. 1 of the drawings, which illustrates an aircraft restraining and handling system 10 in accordance with a preferred embodiment of the present invention. The system 10 is, in this example, provided on the deck of a ship 12 and is utilised for securing the helicopter on landing on the deck 13, and then moving the helicopter to a position suitable for engaging with an aircraft transfer system for moving the helicopter from a landing area of the deck 13 to a hangar (not shown), as will be described in greater detail below.

The system 10 includes a conventional landing grid 14 located in the centre of the deck landing area 13. The grid 14 defines a number of openings adapted to receive and engage a decklock as provided on the helicopter. The decklock is extended on landing the helicopter on the deck to engage with the grid 14 in a harpoon-like manner to provide initial securement of the helicopter on the deck. In most helicopters the decklock is aligned with the rotor axis, midway between the main wheels 16a, 18a of the helicopter.

FIG. 1 illustrates the location of the main wheels 16a, 18a and the nose wheel 20a of a helicopter which has landed with its decklock 22 in the centre of the landing grid 14 and the longitudinal axis of the helicopter 24a parallel the main axis of the ship 26. However, such accuracy is very difficult to achieve, particularly in anything other than flat calm conditions, and the other illustrated starboard main wheels 16 show the "landing scatter" which would typically be encountered. The wheels 16 shown in solid outline illustrate a 15° offset from the ship's axis while the wheels 16 shown in broken outline illustrate a 20° offset.

Reference is now made to FIGS. 2a and 2b of the drawings which illustrate, in cross-section, one of two restraining beams 28, 30 forming part of the restraining system. The beam 28 will be described as exemplary of both. The beams 28, 30 are located outboard of the landing grid 14 and outboard of the wheel landing area 13 and, when not in use, occupy a storage position within deck recesses 29, 31, as shown in FIG. 2a, An which the upper surface of the beam 28 is flush with the surface of the deck 13. To provide a smooth deck surface, the beam 28 includes a deck plate 32 which provides a smooth and continuous deck surface when the beam 28 is in the storage position. The beam 28 of this example is approximately 5.5 meters long.

The beam 28 is attached to two rotatable brackets 33, 34, each bracket 33, 34 being driven by a pair of stainless steel recirculating roller screws 35 (only one shown). The four screws provided for each beam 28, 30 are mechanically synchronised to each other and their displacement is measured by appropriate shaft encoders 36. Drive for the screws 35 is provided by hydraulic motor 37. Such stainless steel recirculating roller screws have been used successfully in other off-shore applications and accommodate the marine environment without difficulty; furthermore, they are well able to dope with shock and are suitable for operation in applications likely to experience contamination with dirt, ice, chemical deposit or poor lubrication. Of course those of skill in the art will realise that the other drive arrangements, such as belts, roller chains, cables and the like may be provided for the beams. Alternatively, the beams may themselves be provided with drive motors for driving, for example, pinions engaging racks formed on the deck.

To actuate the beam 28, the screws 35 pull on the brackets 33, 34 through roller nuts 38 and flexible links 39. Initial movement causes inboard wheels 40 on the brackets 33, 34 to roll up an inclined surface 41 to the level of the base of a beam rail 42, 43. At the latter part of this movement, outboard wheels 44 roll up an inclined ramp 45 on to the top of the beam rail 42, 43. In this way the beam 28 is rotated and elevated to operate at the level of the deck.

The beam 28 defines a box-section 46 and an inboard channel section 47. The inboard face of each beam channel 47 is provided with a layer of shock absorbing material 51. Within the channel section a latching mechanism 48 is constrained to slide along its length. A further stainless steel recirculating roller screw 49 is used to drive the latching mechanism 48, in a similar manner to a lead screw of a machine tool. The drive to the latching mechanism screw 49 is provided by a stainless steel roller link chain 50 (FIG. 1) which runs within the height of the rail and is brought up to and returned from the screw via idling sprockets mounted on each aft bracket 33. The chain 50 itself is driven by a hydraulic motor 52 and the position of the latching mechanism 48 along the beam 28 is determined via a shaft encoder 53.

The beam rail sections 54 are of stainless steel and each accommodate two beam drive screws 35 and the inboard rollers 40 of the respective bracket 33, 34. The outboard rollers 44 roll on the top face of the rail sections. The beam rails 42, 43 are covered by a hinged flap when not in use, in order to keep out foreign objects.

At the forward end of each beam 28, 30 a hinged traversing plate 55 (approximately 0.5 m×0.5 m) is provided and slides on top of the forward beam rails. On the underside of each plate a bearing, such as the TURCITE (TM) bearing facilitates movement of the plate over the rail. To move an aircraft athwartships, as will be described, the main wheels are rolled on to the respective plates 55.

Figure 8:
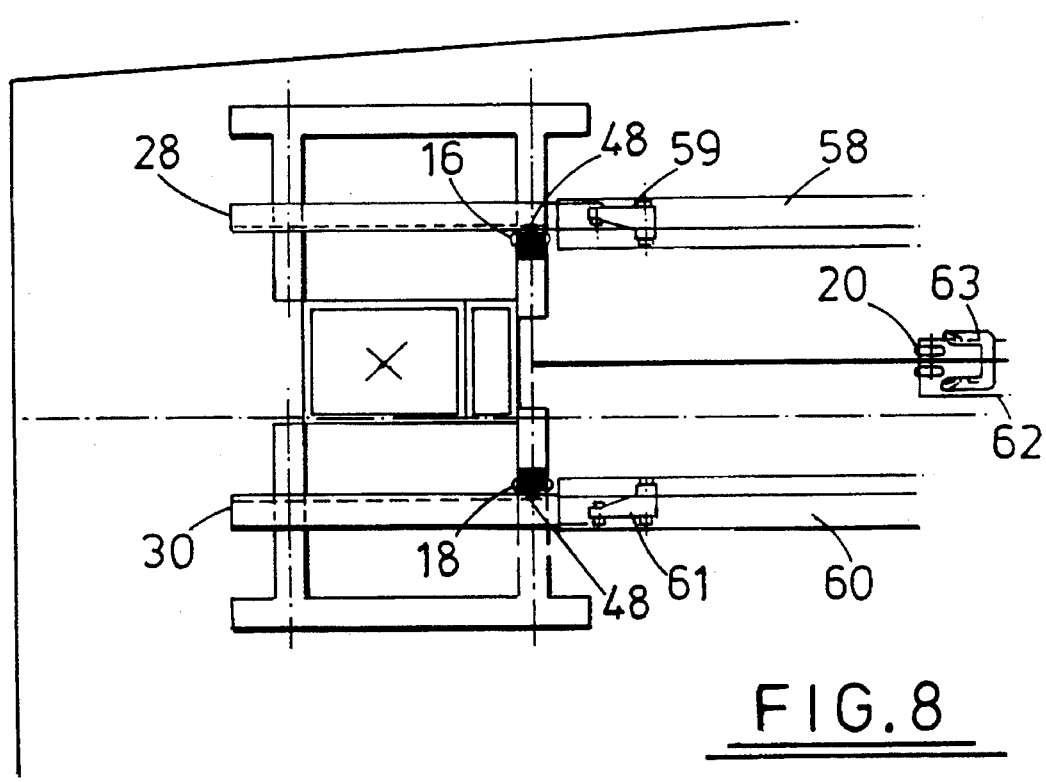

Also shown in FIG. 1 are three transfer rails 58, 60, 62 which lead to the hangar (not shown). Each rail 58 60, 62 is provided with a respective shuttle 59, 61, 63 (FIG. 8) adapted to engage the main wheels and nose wheel 16, 18, 20 of the helicopter, to transfer the secured helicopter from the deck 13 to the hangar.

Figure 4:
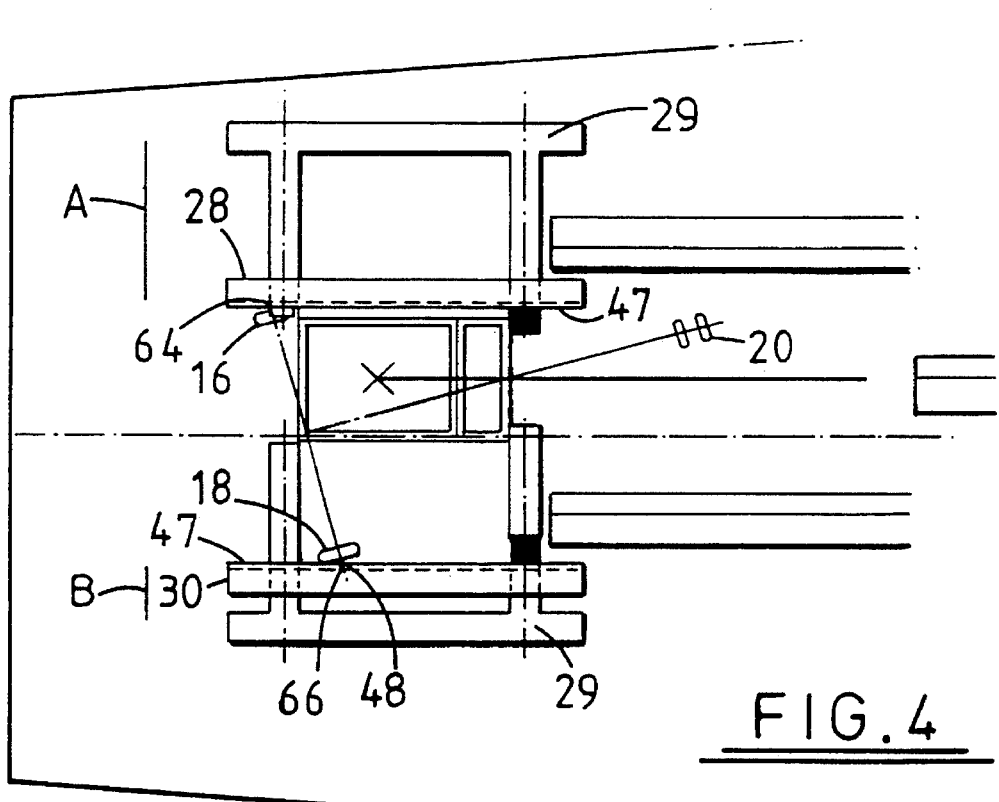
FIGS. 4, 5, 6, 7, 8 and 9 are views illustrating the further handling steps of the aircraft, subsequent to the initial landing of the aircraft as illustrated in FIG. 3.

The operation of the system 10 will now be described with reference to FIGS. 3 through 8 of the drawings. Reference is first made to FIG. 3 which illustrates the positions of the main wheels and nose wheel 16, 18, 20 of a helicopter which has landed at the extreme aft and starboard side of the grid with a heading of 15° to the ship's centre line, such that the decklock provided on the helicopter engages with the corner of the landing grid 14. Immediately the decklock engages with the landing grid 14, the restraining beams 28, 30 are actuated and are lifted from their storage positions (FIG. 2a) before moving transversely inwardly along the rails 42, 43, as indicated by arrows A, B, until they contact the respective main wheels 16, 18 of the helicopter (FIG. 4). In this particular example, the beams 28, 30 are adapted to engage the spurs 64, 66 which extend transversely from the wheels 16, 18. On initial engagement of the beams 28, 30 with the respective spurs 64, 66, the spurs are located within the channel sections 47. The upper wall of each channel section 47 (FIG. 2b) prevents upward movement of the spurs 64, 66 and thus minimises the likelihood of the helicopter toppling on the deck 13. Further, on the beams 28, 30 stalling against the wheels 16, 18, the latch mechanisms 48 provided on the beams 28, 30 are actuated and travel along the beams 28, 30 from their aft storage positions until they engage with the respective spurs 64, 66 and secure the spurs 64, 66 against longitudinal movement. Thus, a very short period after landing on the deck 13, the helicopter is securely restrained by the beams 28, 30, in addition to the engagement of the decklock in the landing grid 14.

With an oblique landing near the limit of operation of the system it may be advantageous to rotate the aircraft using tail rotor thrust about the decklock in order to optimise the length of spur engaged by the beams 28, 30. No fine degree of accuracy of rotation is required since a heading of up to ±5° can easily be achieved by the pilot, stopping rotation of the aircraft using the main wheel brakes. The pilot rotates the aircraft nose wheel through 90°.

Figure 5:
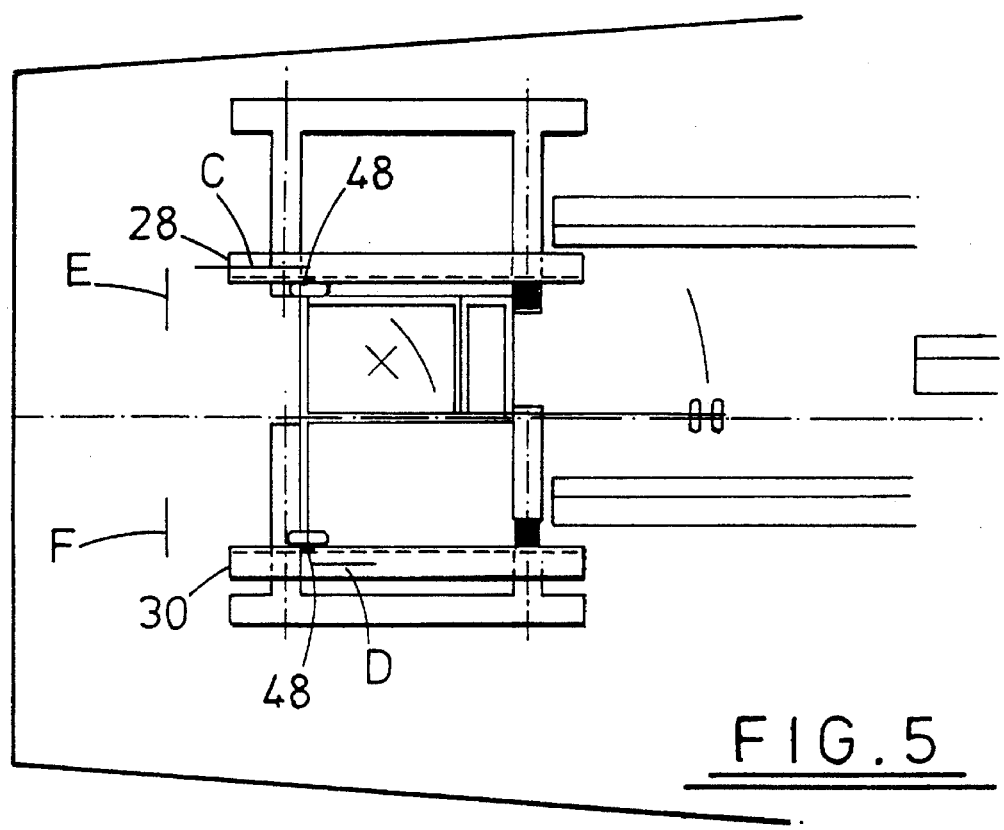

After initial engagement, and possibly some degree of rotation under control of the pilot, the helicopter is rotated such that it lies parallel to the longitudinal axis of the ship 26. This requires that the nose wheel 20 is turned through 90° to the position shown in FIG. 4. The displacement of the latches 48 from the stowed condition is known from the displacement encoders 53, and moving the latches 48 such that they have a similar displacement from the stowed post,ions will result in the centre line of the aircraft being parallel to that of the handling system. Thus, the latches 48 are actuated to move in the appropriate directions, indicated by arrows C, D, to rotate the helicopter about the decklock, the beams 28, 30 moving transversely outwardly, in the direction of arrows E, F, (FIG. 5) to accommodate versine movement. Movement of the latches continues until the helicopter is parallel with the ship axis (and handling system) 26, as illustrated in FIG. 5.

Figure 6:
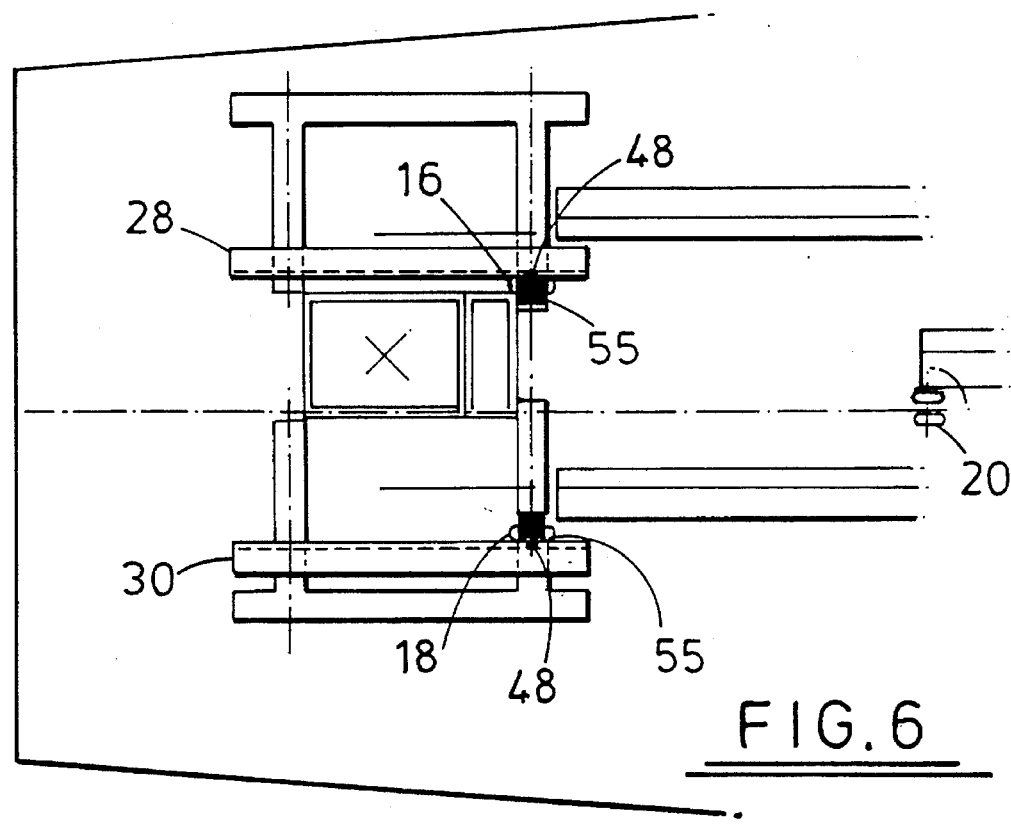

The helicopter is next moved forwardly, after releasing the decklock, utilising the latches 48, until the main wheels of the helicopter 16, 18 are located on the plates 55, as shown in FIG. 6. The nose wheel 20 is rotated through 90°. The beams 28, 30 are then moved transversely, in the direction of arrows G (FIG. 7), to align the wheels with the rails 58, 60, 62.

Figure 9:
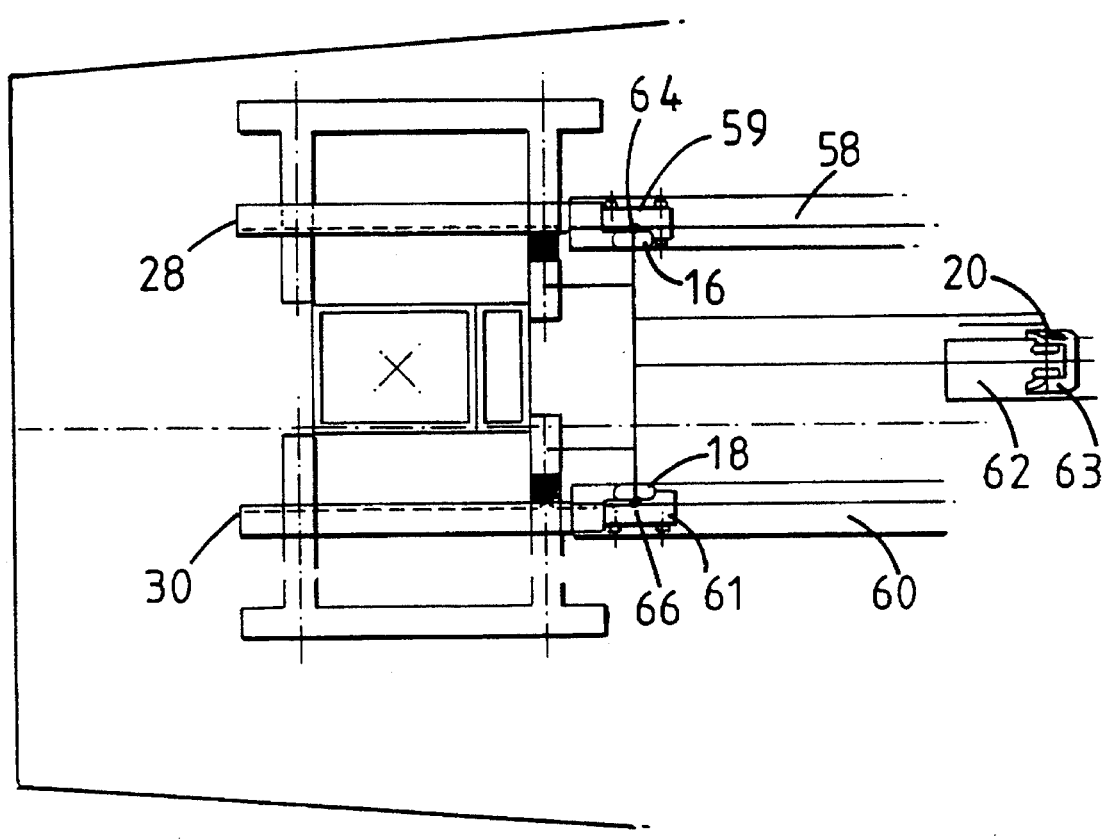

The aircraft nose wheel 20 is rotated back through 90° to a fore and aft position. Both main wheel shuttles 69, 61 are brought fully aft and abut against the respective beams 28, 30 and the nose wheel shuttle is brought aft to an appropriate station (FIG. 9).

The latches 48 are then utilised to move the aircraft forwardly, from the plates 55, until the noes wheel 20 automatically engages with the nose wheel shuttle 63. The helicopter is then pulled forwards utilising the nose wheel shuttle 63, the latches 48 releasing the main wheel spurs 64, 66 such that the spurs may be pulled, with continuity of security, into the main wheel shuttles 59, 61, as illustrated in FIG. 9. The helicopter may then be moved along the rails 58, 60, 62 to the aircraft hangar.

It will be noted that during all of the above operations the main wheel spurs 64, 66 are secured either by the beams 28, 30 and latches 48 or the shuttles 59, 61, and thus there is minimal risk of the aircraft toppling or sliding uncontrollably on the deck 12. It will further be noted that the operation does not require the presence of operators on deck and thus reduces the risk to personnel in rough sea conditions.

Figure 7:
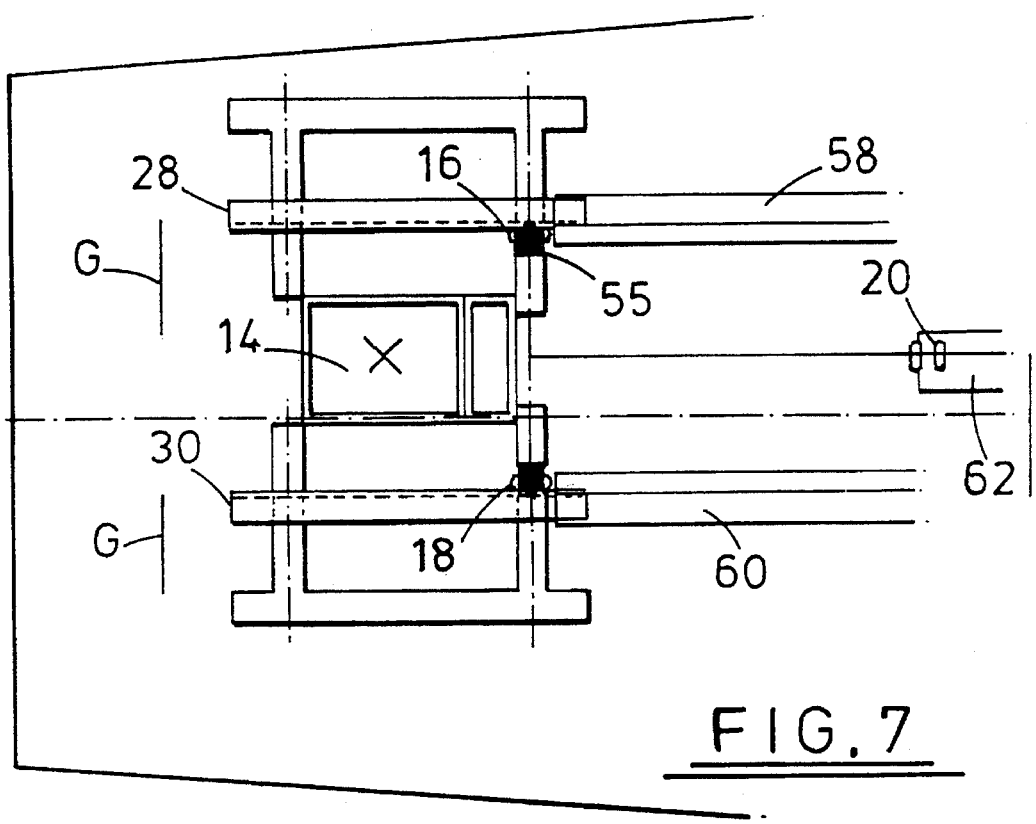

For weapons handling the aircraft is aligned as illustrated in FIG. 7 and pulled aft by the latching mechanism to enable the decklock 22 to be engaged with the grid 14. The beams 28, 30 may be retracted although it is possible to enhance the security of the aircraft by keeping them in position.

Reference is now made to FIGS. 10 to 15, which illustrate an aircraft restraining and handling system in accordance with a second embodiment of the present invention. This second embodiment features a similar restraining beam arrangement to that described above, but is provided with a circular landing grid 14a and a simplified transfer arrangement. Further, rather than three transfer rails 58, 60, 62 and associated shuttles 59, 61, 63, a single rail 70 is used in conjunction with a traversing frame 72. The frame 72 it rigidly guided by the rail 70 and may be attached, through a latching arrangement 76, to the main wheel spurs 64, 66. This provides a two point attachment to the aircraft, thus guaranteeing security against weather cocking which could occur if a single attachment point is used. The steering of the aircraft is controlled from the main wheel spurs 64, 66.

Drive to the frame 72 is via a stainless steel roller link chain 78. This requires only one comparatively small hydraulic motor so which takes up less space and weight and has reduced maintenance compared to the transfer arrangement of the first described embodiment, which utilises a conventional system of wires, pulleys and winches. The use of the roller link chain 78 enables a more accurate encoder 82 to be used for the control system 84 in place of wire pulley measuring systems which can have slippage. The chain 78 is supported within the rail 70 by a high density polyurethane guide channel, which eliminates the need for lubrication and which also exhibits good sound damping characteristics.

The sequence of operation to bring a helicopter from landing into the hangar will now be described with reference to FIGS. 10 to 15.

FIG. 10 is a plan view of the flight deck and shows the securing beams 28, 30 housed flush with the deck 13 and outboard of the landing grid 14a.

FIG. 11 illustrates a helicopter having landed at a 15° heading to the ship's centre-line and the decklock 22 engaged on the extreme port side of the grid 14a. The operator at the system control console then actuates the system. This causes the securing beam drive screws 35 to rotate the beams 28, 30 out of the deck 12 and travel inboard with a light force. Their movement is stopped when the beams 28, 30 come into contact with the main wheel spurs 64, 66 of the aircraft. The face of the beam that contacts the spur is covered with a shock absorbing material in order to reduce the beam decelerating force. When the beams 28, 30 are against the spurs 64, 66, each latching mechanism 48 travels along the beam channel 47 and automatically latches onto the spur 64, 66. The aircraft is now captive within the handling system with forces in the three principal dimensions being contained, thus preventing any unwanted aircraft movement. The pilot can now disengage the decklock 22, carry out blade folding and shut down engines.

Because the aircraft is shown to have landed obliquely and off-centre, the traversing frame 72 can be moved aft directly into position. The exact disposition of the aircraft on the grid is known by the control system, though signals from the various encoders 36, 53 and therefore it will know if the traversing frame 72 can be brought into position without moving the aircraft.

Figure 12:
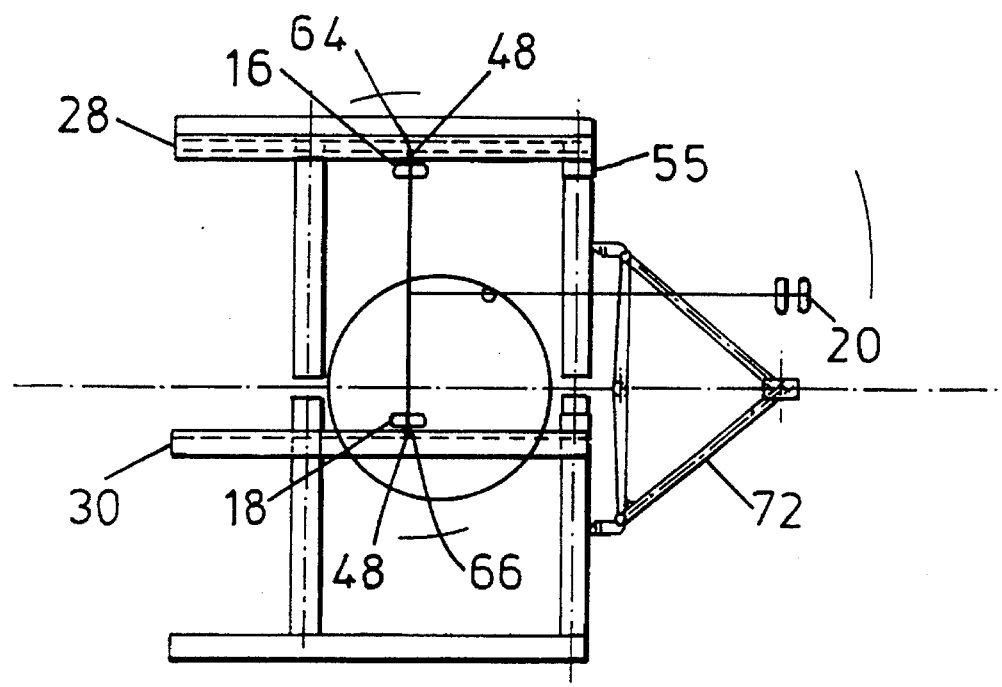

The aircraft is then rotated about the centre of the main wheel axis by the differential movement of the beam latches 48 until both latches are equally displaced, when the aircraft heading will be parallel to the system centre-line (FIG. 12). The securing beams 28, 30 are moved slightly outboard by the management system to accommodate the versine movement as the aircraft is rotated.

Figure 13:
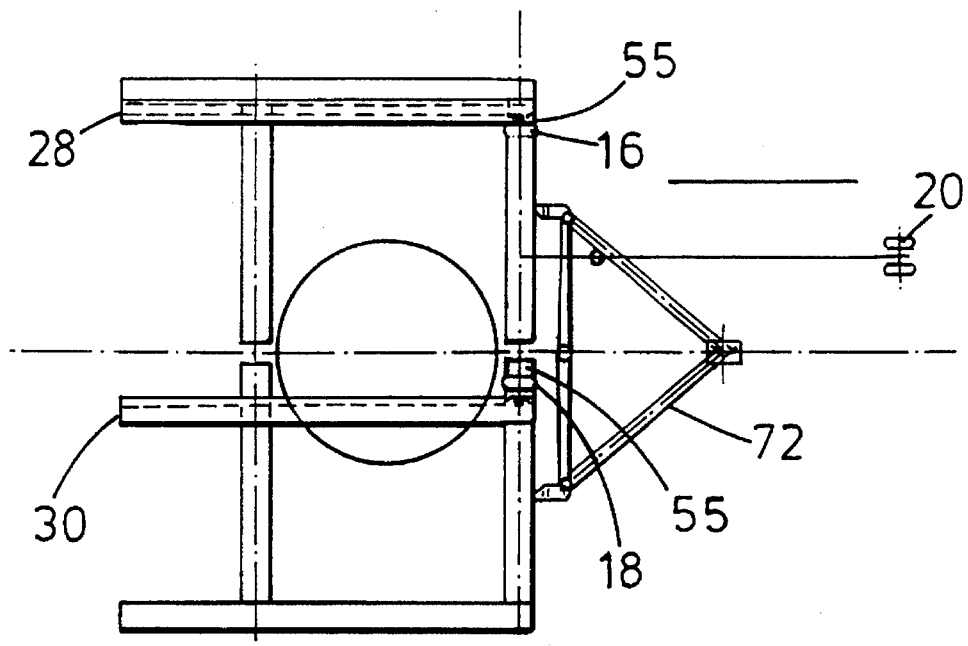

The aircraft is then moved forward by equal movement of the latches 48 until the main wheels mount the traversing plates 55 (FIG. 13).

Figure 14:
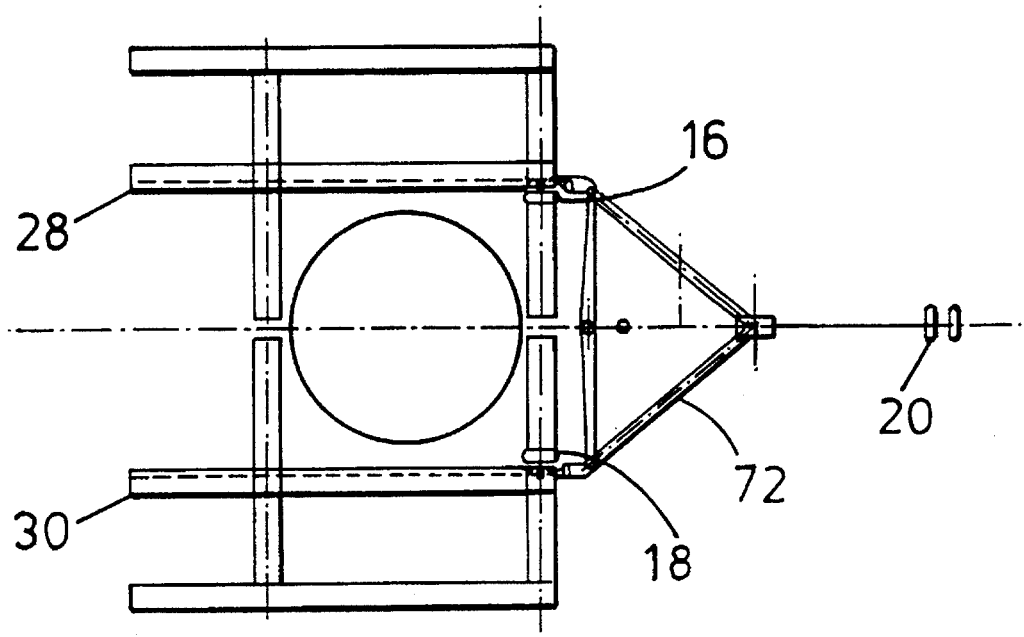

The securing beams 28, 30 are next moved athwartships to bring the aircraft directly onto the ship's centre-line (FIG. 14).

Figure 15:
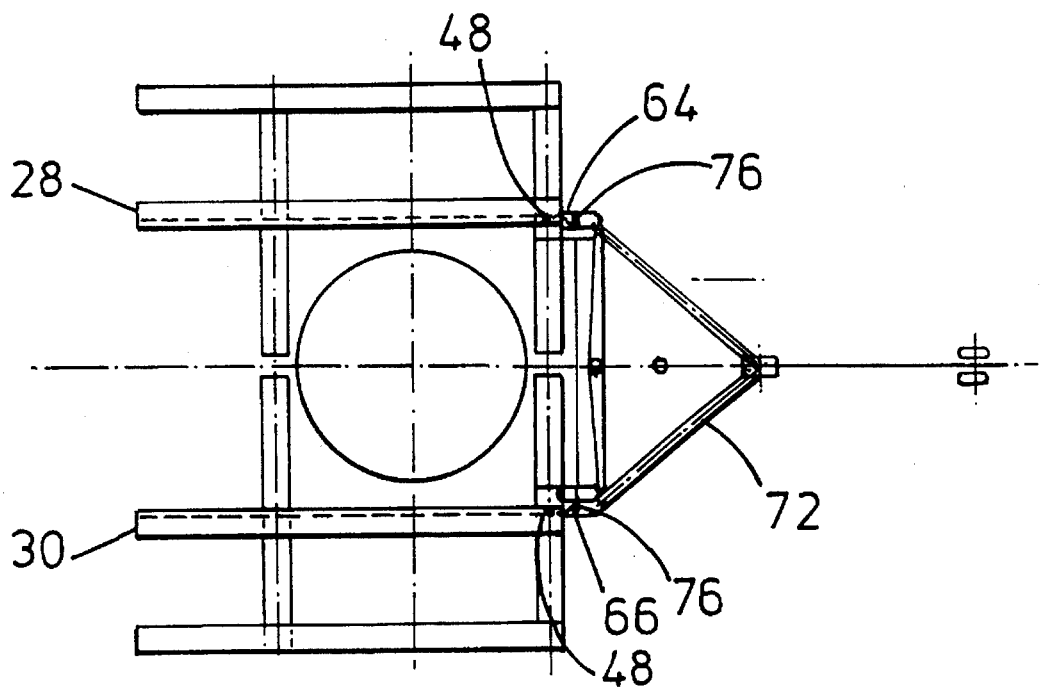

Finally, the latches 48 move the aircraft forward a short distance when the spur security is transferred from the securing beam latches 48 to the traversing frame latches 76 (FIG. 15).

The traversing frame 72 can now bring the aircraft directly into the hangar with accuracy and security.

For weapons handling after the aircraft has landed, the aircraft is aligned as described above in FIGS. 10 to 14. Since the aircraft will be re-armed and refueled on the deck, the traversing frame 72 does not have to be attached to the main wheel spurs 64, 66. Weapon trolleys will be prepared in the magazine and brought to the hangar. The trolleys are then rigidly attached by links to the aft end of the traversing frame 72 and offset athwartships as required to reflect the weapon pylon positions. The traversing 72 frame is moved aft towards the aircraft pushing the weapon trolleys. This will bring the weapons accurately under the pylons.

Ideally, the weapon trolleys should be capable of gently lifting the weapons into position where they would automatically be locked into the pylons. Alternatively, deck personnel will be required to use manual hoists to lift the weapons into position while personnel are on deck, and in particular in severe weather they may be attached by lifeline to the traversing frame for security.

In addition, it will be clear to those of skill in the art that the above-described embodiments are merely exemplary of the present invention and that various modifications and improvements may be made thereto without departing from the scope of the invention.

I claim:

1. An aircraft restraining system adapted for securing and maneuvering a wheeled aircraft on the deck of a ship, the system comprising:

two elongate restraining beams transversely movable from respective storage positions adapted for engaging at least two transversely spaced portions of an aircraft positioned on the deck, each restraining beam including a restraining member adapted for engaging the respective portions of the aircraft above the deck and restricting longitudinal movement thereof, without restricting rotation of the aircraft wheels, and drive means for moving at least one of the restraining members along the respective beam to permit rotation of the aircraft on the deck while maintaining the aircraft wheels in rolling contact with the deck.

2. The aircraft restraining system of claim 1, wherein, in the storage position, the restraining beams lie flash with or below the deck.

3. The aircraft restraining system of claim 1, wherein the restraining beams are movable from an initial aircraft engaging position while adapted to remain engaged with the aircraft.

4. The aircraft restraining system of claim 1, wherein each restraining member is in the form of a latch.

5. The aircraft restraining system of claim 4, wherein each latch is movable from a latch storage position at one end portion of the beam to be engageable with the aircraft.

6. The aircraft restraining system of claim 4, wherein both latches are drivable for longitudinal movement along the respective beams to permit longitudinal movement of the aircraft on the deck while maintaining the aircraft wheels in rolling contact with the deck.

7. The aircraft restraining system of claim 1, further including means for transferring the aircraft from a landing area, the restraining beams being movable to bring the portions of the aircraft to engage with the transfer means.

8. The aircraft restraining system of claim 7, wherein the transfer means includes respective shuttles adapted for engaging said portions of the aircraft.

9. The aircraft restraining system of claim 8, wherein the shuttles are adapted to secure the aircraft against toppling and are movable along respective transversely spaced tracks.

10. The aircraft restraining system of claim 7, wherein the transfer means includes a transversing frame movable along a single track and including latch arrangements adapted for engaging the portions of the aircraft.

11. The aircraft restraining system of claim 1, further including transversely movable support surfaces adapted for the main wheels of the aircraft, to permit transverse movement of a secured aircraft without lifting the aircraft from the deck.

12. The aircraft restraining system of claim 11, wherein the transversely movable support surfaces are fixed to the restraining beams.

13. The aircraft restraining system of claim 6, further including transversely movable support surfaces adapted for the main wheels of the aircraft, the support surfaces being fixed to the respective securing beams, such that a secured aircraft may be moved longitudinally using the latches to position the main wheels on the support surfaces and the aircraft then moved transversely without lifting the aircraft from the deck.

14. Apparatus adapted for securing and maneuvering a wheeled aircraft on a deck of a ship, the apparatus comprising:

two elongate restraining beams adapted to be movably mounted on the deck of a ship and being locatable one on each side of a landing area of the deck and parallel to the center line of said landing area;

means for moving the beams across the deck to be engageable with respective transversely spaced portions of a wheeled aircraft positioned on the landing area;

restraining members mounted on the beams and adapted for engaging the portions of the aircraft to restrict longitudinal movement of the aircraft;

means for (i) moving at least one of the restraining members along the respective beam to rotate the aircraft on deck with the wheels of the aircraft in rolling contact with the deck, to position the longitudinal axis of the aircraft parallel to the center line of the landing area and (ii) moving the restraining members along the beams to move the aircraft longitudinally on the deck with the wheels of the aircraft remaining in rolling contact with the deck; and transversely movable support surfaces adapted for receiving and supporting the wheels of the aircraft and permitting movement of the aircraft across the deck to locate the aircraft at a desired position on the deck.

15. The apparatus of claim 14, wherein said beams are movable athwartships across the deck.

16. A method of securing and maneuvering a wheeled aircraft on a deck of a ship, the method comprising the steps of:

providing two elongate restraining beams on the deck of a ship, the beams being located one on each side of a landing area;

moving the beams across the deck to engage respective transversely spaced portions of a wheeled aircraft positioned on the landing area;

engaging said portions of the aircraft with restraining members mounted on the beams to restrict longitudinal movement of the aircraft;

moving at least one of the restraining members along the respective beam to rotate the aircraft on the deck, with the wheels of the aircraft in rolling contact with the deck, to position the longitudinal axis of the aircraft parallel to the center line of the landing area of the deck;

moving the restraining members along the beams to move the aircraft longitudinally on the deck and parallel to the center line of the ship, with the wheels of the aircraft remaining in rolling contact with the deck, to locate the wheels over transversely movable support surfaces; and moving the support surfaces across the deck to locate the aircraft at a desired position on the deck.

17. The method of claim 16, wherein the step of moving the support surfaces includes moving the support surfaces athwartships across the deck.

18. An aircraft restraining system adapted for securing and maneuvering an aircraft on the deck of a ship, the system comprising:

at least two elongate restraining beams which are adapted to be movable athwartships across the deck of the ship from respective storage positions in which the beams lie flush with or below the deck to an initial aircraft engageable position adapted for engaging at least two transversely spaced portions of an aircraft positioned on the deck, each restraining beam including a restraining member adapted for engaging the respective portions of the aircraft on or above the deck and restricting longitudinal movement thereof, and drive means for moving at least one of the members along the respective beam to rotate the aircraft.

\* \* \* \* \*